W. L. WASHINGTON.
EMERGENCY TANK FOR AUTOMOBILES.
APPLICATION FILED FEB. 18, 1921.
1,421,050.
Patented June 27, 1922.
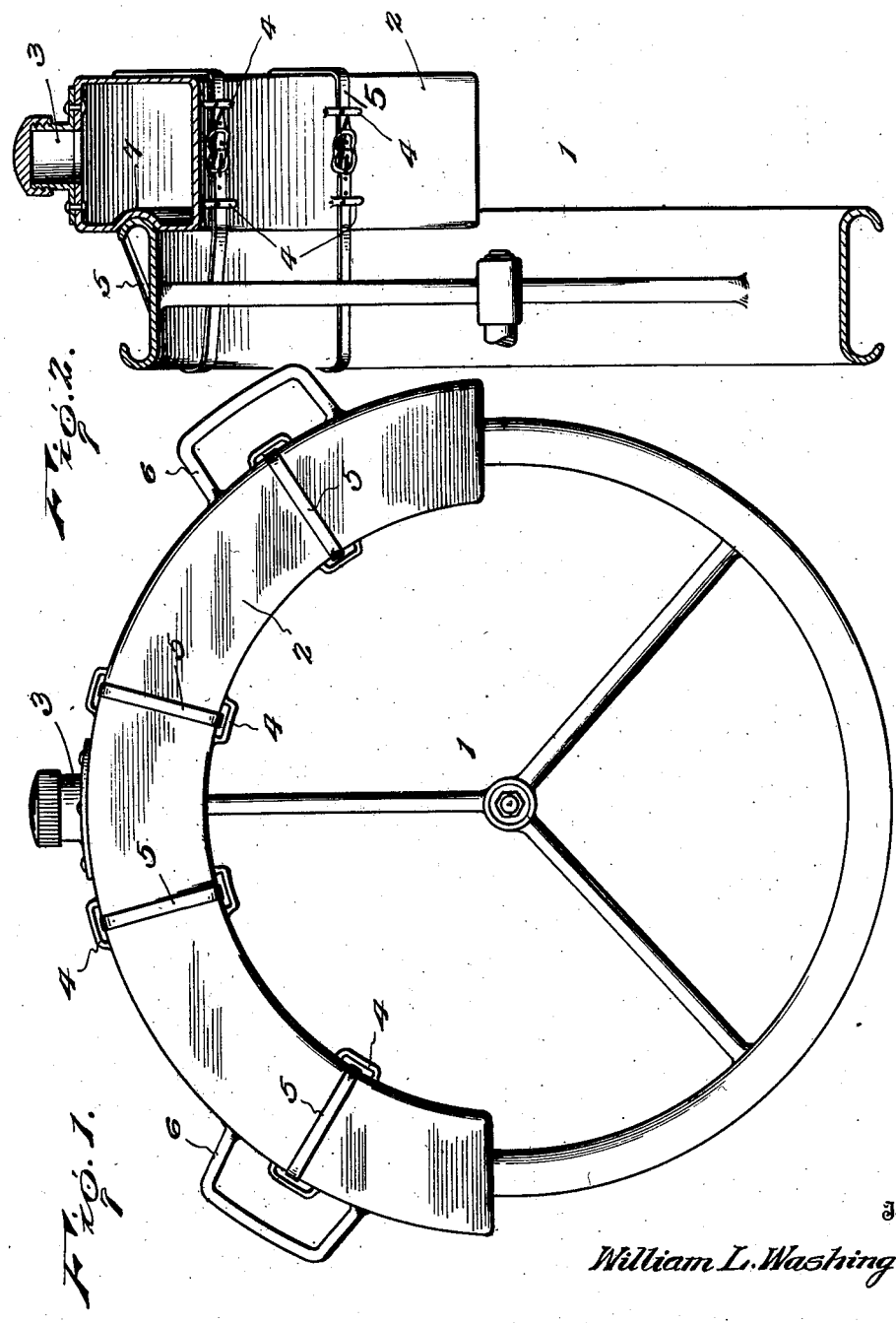
Inventor
William L. Washington.
By Lacey & Lacey, Attorneys

UNITED STATES PATENT OFFICE.

WILLIAM L. WASHINGTON, OF EAST YOUNGSTOWN, OHIO.

EMERGENCY TANK FOR AUTOMOBILES.

1,421,050. Specification of Letters Patent. Patented June 27, 1922.

Application filed February 18, 1921. Serial No. 446,139.

*To all whom it may concern:*

Be it known that I, WILLIAM L. WASHINGTON, a citizen of the United States, residing at East Youngstown, in the county of Mahoning and State of Ohio, have invented certain new and useful Improvements in Emergency Tanks for Automobiles, of which the following is a specification.

This invention has for its object the provision of a simple and inexpensive device by the use of which a reserve supply of fuel may be carried by automobilists. It frequently happens that through oversight or from other causes motorists who are touring are unable to proceed because the supply of fuel is exhausted and it becomes necessary to leave the automobile upon the road until one of the tourists can obtain a supply of fuel from some one in the neighborhood or can locate a garage for the same purpose. My invention seeks to avoid such emergency by providing a device which may be carried upon the automobile conveniently and which will contain a supply of fuel sufficient to tide over a period necessary to reach a garage or supply house. The invention is illustrated in the accompanying drawings and will be hereinafter fuly set forth.

In the drawings—

Figure 1 is an elevation of an emergency tank embodying my invention and showing the same mounted upon the extra tire holder with which most automobiles are now supplied;

Fig. 2 is a transverse section of the device.

In the drawings, the reference numeral 1 indicates the holder upon which the emergency rim and tire are usually carried and which may be of any well-known or preferred form. My emergency tank consists of an arcuate body 2 which is provided at its center with a filling opening or cap 3 through which the fuel is poured into the tank. The tank is provided at intervals upon its upper and lower sides with eyes or loops 4 through which straps 5 are passed, said straps also passing around the tire or rim holder 1, as shown and as will be readily understood. The straps are held against movement endwise of the tank by the eyes and upon being tightened will firmly secure the tank to the tire or rim holder. The tank is further provided upon its upper side with large loops or handles 6 whereby it may be lifted into place or removed so that the fuel may be poured into the usual fuel tank. The emergency tank may be of any desired cross sectional form, but whatever configuration may be preferred it should have an internal bead 7 upon one side wall so that an external groove will be presented to engage the edge of the rim or tire holder 1, as shown clearly in Fig. 2, to assist in supporting the emergency tank and preventing dropping of the same. When the straps 5 are tightened, the tank will be drawn firmly to and against the edge of the tire or rim holder 1 and will be thereby securely held against dropping.

Having thus described the invention, what is claimed as new is:

An emergency tank for automobiles comprising an arcuate body provided with an external groove in one side wall extending from end to end of the body, and means for securing the body to a support with the said groove engaging the edge of the support.

In testimony whereof I affix my signature.

WILLIAM L. WASHINGTON. [L. S.]